(12) United States Patent
Berchanskiy et al.

(10) Patent No.: US 10,873,525 B2
(45) Date of Patent: Dec. 22, 2020

(54) DYNAMIC ASYMMETRIC COMMUNICATION PATH ALLOCATION

(71) Applicant: Intel Corporation, Santa Clara, CA (US)

(72) Inventors: Dmitriy Berchanskiy, Roseville, CA (US); Huimin Chen, Beaverton, OR (US); Udaya Natarajan, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 29 days.

(21) Appl. No.: 16/116,824

(22) Filed: Aug. 29, 2018

(65) Prior Publication Data

US 2019/0089624 A1  Mar. 21, 2019

(51) Int. Cl.
*H04L 12/707* (2013.01)
*H04L 12/721* (2013.01)
(Continued)

(52) U.S. Cl.
CPC ............ *H04L 45/24* (2013.01); *H04L 45/121* (2013.01); *H04L 45/22* (2013.01); *H04L 45/38* (2013.01);
(Continued)

(58) Field of Classification Search
CPC ....... H04L 45/24; H04L 45/121; H04L 45/38; H04L 47/2416; G06F 2213/4004
See application file for complete search history.

(56) References Cited

U.S. PATENT DOCUMENTS

2009/0248978 A1* 10/2009 Solomon ............. G06F 13/4282
 711/114
2016/0182354 A1* 6/2016 De ........................ H04L 45/121
 370/252
(Continued)

FOREIGN PATENT DOCUMENTS

WO  WO-2018000406 A1 * 1/2018 ......... G06F 13/4022

OTHER PUBLICATIONS

Apple Inc., et al., "Universal Serial Bus 3.2 Specification, Revision 1.0", Sep. 22, 2017, accessed at: https://www.usb.org/document-library/usb-32-specification-released-september-22/2017-and-ecns, 548 pages.
(Continued)

*Primary Examiner* — Ayaz R Sheikh
*Assistant Examiner* — Louis Samara
(74) *Attorney, Agent, or Firm* — Alliance IP, LLC

(57) ABSTRACT

An apparatus may comprise a port to couple to a plurality of communication paths comprising a first, second, third, and fourth communication path, the communication paths each having a direction of either a receive path or a transmit path, the communication paths comprising a first communication path having a direction that may be selectively configured as a receive path or a transmit path. The apparatus further comprises a controller comprising circuitry, the controller to in response to a communication path reconfiguration command, reconfigure the direction of the first communication path such that the first communication path, second communication path, and third communication path have the same direction and the fourth communication path has a direction opposite to the direction of the first, second, and third communication paths.

20 Claims, 9 Drawing Sheets

(51) Int. Cl.
*H04L 12/727* (2013.01)
*H04L 12/851* (2013.01)
*H04L 12/853* (2013.01)

(52) U.S. Cl.
CPC .......... *H04L 45/66* (2013.01); *H04L 47/2416* (2013.01); *H04L 47/2483* (2013.01)

(56) References Cited

U.S. PATENT DOCUMENTS

2017/0048131 A1\* 2/2017 Walker ................... H04L 45/02
2017/0091060 A1\* 3/2017 Vadivelu ............... G06F 11/221
2017/0270067 A1\* 9/2017 Hu ........................ G06F 13/366

OTHER PUBLICATIONS

Hewlett-Packard Company et al., "Universal Serial Bus 3.0 Specification, Revision 1.0", Nov. 12, 2008, accessed at: https://www.usb3.com/whitepapers/USB%203%200%20(11132008)-final.pdf, 482 pages.

Hewlett-Packard Company et al., "Universal Serial Bus 3.1 Specification, Revision 1.0", Jul. 26, 2013, accessed at: https://manuais.iessanclemente.net/images/b/bc/USB_3_1_r1.0.pdf, 631 pages.

\* cited by examiner

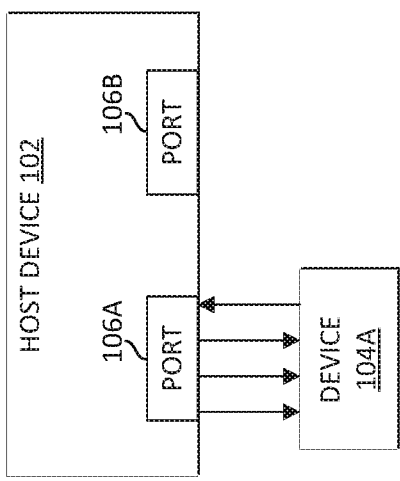
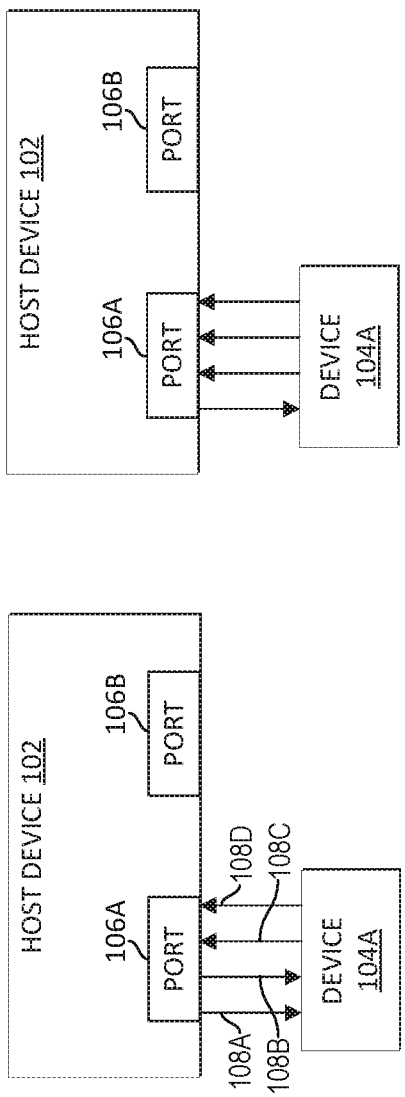
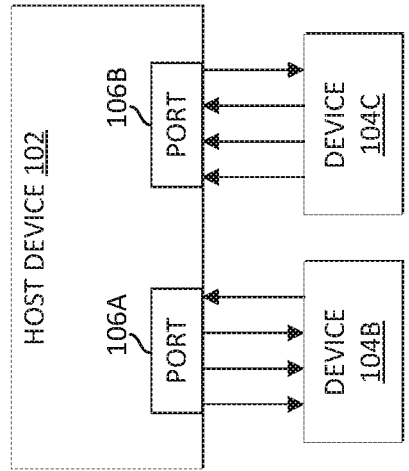
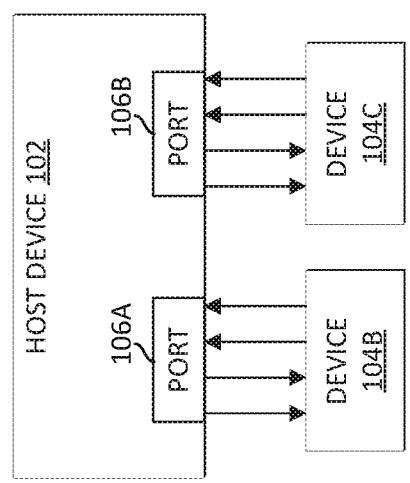

PHY CAPABILITY LBPM

| | B0 | B1 | B2 | B3 | B4 | B5 | B6 | B7 |
|---|---|---|---|---|---|---|---|---|
| Gen 1x1 | 0 | 0 | 0 | 0 | 0 | 0 | 0 | 0 |
| Gen 2x1 | 0 | 0 | 1 | 0 | 0 | 0 | 0 | 0 |
| Gen 1x2 | 0 | 0 | 0 | 0 | 0 | 0 | 1 | 0 |
| Gen 2x2 | 0 | 0 | 1 | 0 | 0 | 0 | 1 | 0 |
| *Gen x 3x1, 1x3 | 0 | 0 | 1 | 0 | 0 | 0 | 1/0 | 1 |
| | Reserved | Reserved | Data Rate | Data Rate | Reserved | Reserved | # of lanes | Asymmetric capable |

DYNAMIC ASYMMETRIC COMMUNICATION PATH ALLOCATION

FIELD

The present disclosure relates in general to the field of computer development, and more specifically, to dynamic asymmetric communication path allocation.

BACKGROUND

A host may communicate with a device via various communication paths that carry, e.g., configuration data, payload data, power, and/or other signals. A communication path may comprise one or more wires or other transmission media of the cable.

BRIEF DESCRIPTION OF THE DRAWINGS

FIGS. 1A-1E illustrate a host device in communication with one or more peripheral devices in accordance with certain embodiments.

Like reference numbers and designations in the various drawings indicate like elements.

DETAILED DESCRIPTION

Figure 2:
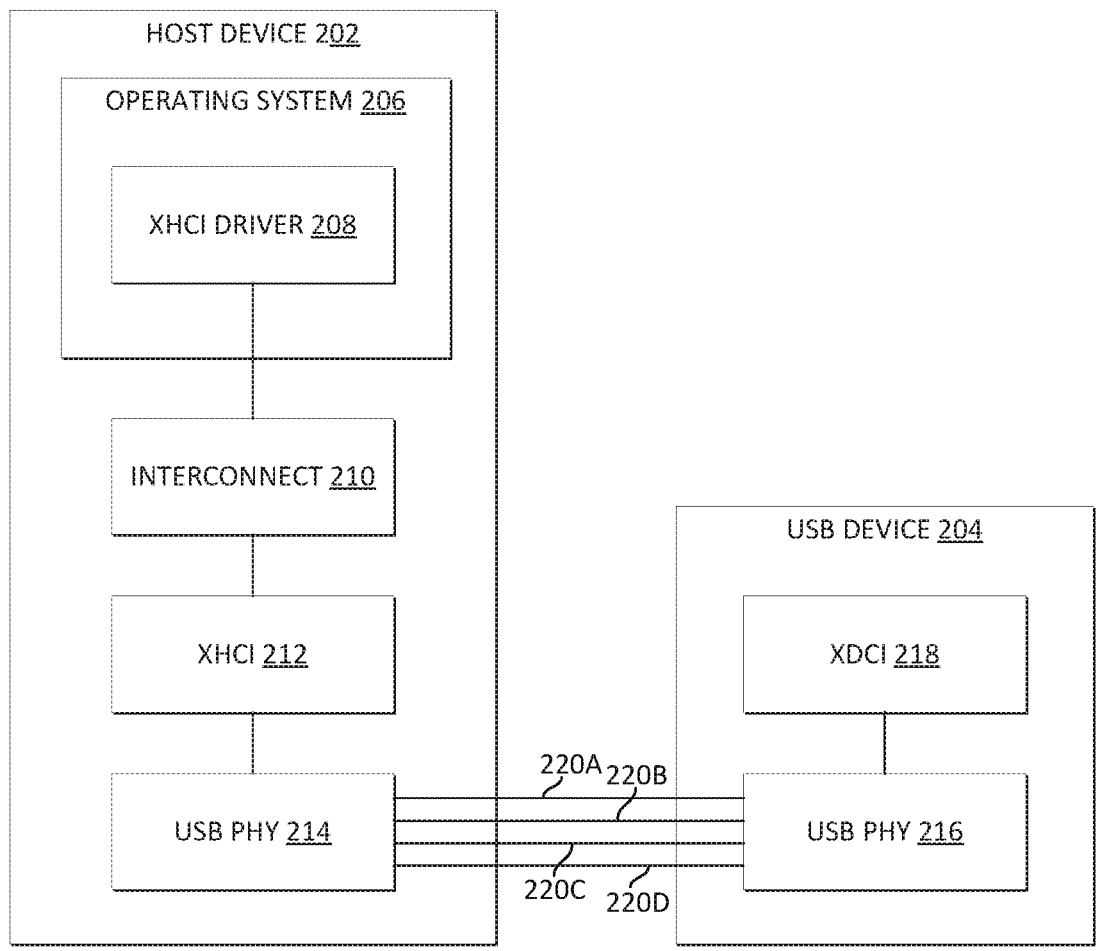
FIG. 2 illustrates a host device in communication with a Universal Serial Bus (USB) device in accordance with certain embodiments.

FIGS. 1A-1E illustrate a host device 102 in communication with one or more peripheral devices 104 (e.g., 104A, 104B, 104C) in accordance with certain embodiments. A host device 102 may include any suitable computing device, such as a processor or a system-on-a-chip (SoC) and a peripheral device 104 may be any suitable device to communicatively couple to the host device. For example, a peripheral device 104 may be a device that provides input to the host device 102 and/or receives output from the host device.

Host device 102 includes one or more ports 106 (e.g., 106A, 106B) to couple to a peripheral device 104. The port 106 may couple to a plurality of communication paths 108 (e.g., 108A, 108B, 108C, 108D), where each communication path 108 may be configured as a transmission (Tx) path or an (Rx) path. When a communication path 108 is configured as a Tx path, the host device 102 may transmit data through the communication path 108 to the device 104. When a communication path 108 is configured as an Rx path, the host device 102 may receive data through the communication path 108 from the device 104 (thus as used herein the designation of a direction of a communication path may be defined from the perspective of the host device 102). In some embodiments, one or more of the communication paths 108 may be selectively configured as a Tx or an Rx path. In various embodiments, one or more of the communication paths 108 may be non-configurable (e.g., fixed). For example, a particular communication path 108 may only be used as a Tx path, while another communication path 108 may only be used as an Rx path. In some embodiments, communication paths 108 may include at least one non-configurable unidirectional communication path (i.e., a communication path having a direction that is not configurable) and at least one communication path having a direction that is selectively configurable (i.e., as a Tx path or an Rx path). In some embodiments, the non-configurable nature of a communication path may refer to the inability to reconfigure the direction of the communication path for the duration of the link once an initial direction for the communication path has been set (e.g., in response to connecting the peripheral device to the host device).

The Universal Serial Bus (USB) 3.2 standard doubles the link bandwidth (relative to USB 3.1) to 20 Gbps by introducing two lane operation, called x2 mode (in some embodiments, a lane may comprise a pair of communication paths, such as a Tx path and an Rx path). In x2 mode, an equal number of Tx and Rx paths are allocated, and the allocation remains fixed throughout the USB session, regardless of the traffic patterns. However, in many applications, USB traffic is asymmetrical (i.e., more data may be transmitted by a device than is received by the device, or vice versa). Some examples where the data flow is asymmetrical include video, audio, imaging, file transfer, and instrument data acquisition. Some traffic patterns may always be dominant towards inbound traffic (e.g., imaging or instrumentation), always dominant towards outbound traffic (e.g., display), or alternating between dominant towards inbound traffic and dominant towards outbound traffic (e.g., file transfer). However, the existing USB 3.2 link defines two Tx paths and two Rx paths.

Various embodiments of the present disclosure provide an architectural framework to support dynamic asymmetrical communication path configuration for communication schemes that utilize multiple communication paths (e.g., systems conforming to the USB 3.2 standard specification or other systems comprising reconfigurable communication paths). In various embodiments, backwards compatibility may be maintained with a communication scheme that utilizes multiple communication paths in a symmetric configuration (e.g., a dynamic asymmetric allocation system may maintain backwards compatibility with the USB 3.2 and earlier specifications). Various embodiments described herein may provide one or more technical advantages, such as increased bandwidth utilization and decreased link power usage.

In a particular embodiment, a non-configuration lane (comprising a Tx path and an Rx path) defined in USB 3.2 is modified to be a bi-directional configurable lane wherein each communication path of the lane may change direction dynamically based on expected data transfer behavior. In combination with a separate non-configuration lane (comprising a Tx path and an Rx path that maintain their respective directions), various configurations may be realized: e.g., a 1 Tx path, 3 Rx path configuration; a 2 Tx path, 2 Rx path configuration; or a 1 Rx, 3 Tx path configuration. A particular embodiment may utilize existing USB physical layer (PHY) features with a minimal addition to the USB 3.2 specification to provide dynamic asymmetrical communication path configuration. In various embodiments, the configuration change may be applied to SuperSpeedPlus Architecture Peripheral Devices or SuperSpeedPlus Hubs connected to SuperSpeedPlus Devices. A particular embodiment may utilize an Enhanced SuperSpeed protocol with simplex unicast bus and asynchronous notifications to achieve a higher throughput when the Tx/Rx path directions are changed to align with traffic flow. Some embodiments may improve throughput by 50% with little to no increase in power usage.

In FIG. 1A, communication paths 108A and 108B are configured as Tx paths, and communication paths 108C and 108D are configured as Rx paths (where the designation of Tx and Rx are relative to the host device 102). In various embodiments, when a peripheral device 104 is coupled to the host device 102, the configuration may default to two Tx and two Rx paths. In other embodiments, upon connection of a device 104 to the host device 102, as part of an initialization procedure, a negotiation may take place and the communication paths may be configured in an asymmetric manner (e.g., as shown in FIG. 1B or 1C).

When the traffic pattern is expected to be reception dominant (relative to the host device 102), the system may reconfigure the communication paths 108 as shown in FIG. 1B, where communication path 108A is configured as a Tx path and communication paths 108B, 108C, and 108D are each configured as Rx paths. For example, when system is in a configuration as shown in FIG. 1A and detects a file transfer from device 104 to host device 102, communication path 108B may be reconfigured from a Tx path to an Rx path. This may increase the transfer speed by 50% relative to the configuration of FIG. 1A.

When the traffic pattern is expected to be transmission dominant (relative to the host device 102), the system may reconfigure the communication paths 108 as shown in FIG. 1C, where communication paths 108A, 108B, and 108C are each configured as Tx paths and communication path 108D is configured as an Rx path. For example, when system is in a configuration as shown in FIG. 1A and detects a file transfer from host device 102 to device 104, communication path 108C may be reconfigured from an Rx path to a Tx path. This may increase the transfer speed by 50% relative to the configuration of FIG. 1A.

Various embodiments may also be used to increase the transfer speed between two peripheral devices 104. A symmetric configuration is shown in FIG. 1D, where device 104B is coupled to port 106A of host device 102 and device 104C is coupled to port 106B of the host device. In FIG. 1D, both devices 104 are configured in a symmetric manner, such that each device is coupled to the host device 102 via two Tx paths and two Rx paths. When data (e.g., a large file) is transferred from device 104C to 104B, throughput may be dramatically increased when the communication paths are reconfigured as depicted in FIG. 1E. In the depicted embodiment, one of the communication paths coupling device 104B to device 102 has been reconfigured from a Rx path to an Tx path and one of the communication paths coupling device 104C to host device 102 has been reconfigured from a Tx path to a Rx path. In such an embodiment, the transfer rate from the device 104C to the host device and the transfer rate from the host device to the device 104B may each be increased, leading to much quicker data transfer between devices 104. Similar configurations may provide similar benefits in other applications, such as USB networking (e.g., Ethernet over USB) where the host device 102 is used to bridge, route, or otherwise transfer data between multiple devices of a network.

Host device 102 may comprise any suitable computing system operable to connect to peripheral devices 104 and transmit data to and/or receive data from peripheral devices 104. A host device 102 may comprise one or more processors and one or more ports 106. A host device 102 may comprise or be coupled to any other suitable circuitry, such as memory, interconnect, one or more communication controllers, or other suitable circuitry.

Peripheral devices 104 may include any suitable device to communicate with host device 102. For example, device 104 may be an input device such as a an image scanner, a video recorder, a microphone, a data acquisition device, or other suitable device that generally communicates data to the host device 102; an output device such as a monitor, projector, printer, or other suitable device that generally receives data from the host device 102; or a device such as a communication hub, hard disk drive, flash drive, memory card, or other suitable device to both send and receive data from the host device 102. A peripheral device 104 may include any suitable circuitry, such as one or more processors, one or more ports (similar to ports 106), memory, interconnect, one or more communication controllers, or other suitable circuitry.

In particular embodiments, port 106 may comprise an electromechanical connector to couple to communication paths 108. For example, a connector of port 106 may couple to a cable or other medium that comprises communication paths 108 (and potentially other communication paths) and couples to a corresponding connector of a port of a peripheral device 104. In one example, a connector of port 106 may couple directly to a connector of a port of a peripheral device 104 (and the communication paths 108 may pass through the connectors). In one embodiment, a port 106 may comprise a USB Type-C receptacle that is operable to be coupled mechanically and electrically to a USB Type-C connector of a USB Type-C cable that couples a device 104 to the host device 102 (or the receptacle may be coupled directly to a device such as a memory stick that has a connector, such as a USB Type-C connector).

As used herein, a communication path 108 may refer to one or more communication medium(s) (e.g., one or more conductive wires) and/or other circuitry that enables communication between a source and a destination. As a signal travels through the communication path from a source to a destination, it may be stored, transformed, or have any other suitable operation performed on it before it reaches the destination. A communication path 108 may carry a type of data that is different from other data or signals carried by other communication paths associated with communication paths 108 (e.g., communication paths included in the same cable or on the same connector as communication paths 108). For example, other communication paths may carry control information such as indications of cable (or connector) connectivity or orientation, power management information associated with the transfer of power between devices (e.g., a requested voltage or current), a mode (e.g., a debug accessory mode, audio adapter accessory mode, etc.), configuration information associated with analog audio or low power audio signaling, or any other suitable configuration information. In various embodiments, data carried by communication paths 108 may include data and accompanying information such as headers, address information, etc.

In various embodiments, communication over the communication paths 108 may conform to one or more particular formats or protocols. For example, the communication may be performed using the protocol defined for USB data by the USB 1.x, 2.0, 3.x, or future USB Specification. Various embodiments of the present disclosure may be used with any signaling protocol that includes multiple communication paths for data transfer (such as Peripheral Component Interconnect Express (PCI-X), High-Definition Multimedia Interface (HDMI), or other protocol having multiple communication paths). Although the disclosure herein is not limited thereto, by way of example, the embodiments described herein focus on implementations directed to communications compatible with the USB 3.2 protocol and the USB Type-C protocol. The USB Type-C protocol specifications describe a small form factor connector which can be used for detecting end-to-end attachment/detachment, establishing cable orientation (e.g., flip or twist state), establishing default host/device roles, negotiating power delivery characteristics (a Type-C cable may carry current up to 5 A@ 12V/20V), and providing a guest protocol over configuration channel pins, among other things.

FIG. 2 illustrates a host device 202 in communication with USB device 204 in accordance with certain embodiments. Host device 202 may include any one or more characteristics of host device 102 and USB device 204 may include any one or more characteristics of peripheral device 104. Host device 202 executes an operating system 206 and an eXtensible Host Controller Interface (xHCI) driver 208. The host also includes interconnect 210, xHCI 212, and USB PHY 214. In the embodiment depicted, USB device 204 includes a USB PHY 216 and an eXtensible Device Controller Interface (xDCI) 218. The host device 202 and the USB device 204 may be coupled together, through a USB cable and/or respective USB connectors of the host device 202 and the USB device 204. Communication paths 220 (e.g., 220A-D) may communicate data between USB PHY 214 and USB PHY 216. Communication paths 220 may have any one or more characteristics of communication paths 108.

The xHCI driver 208 is a software driver that may enable operating system 206 to communicate with the xHCI 212. For example, the driver 208 may receive commands from operating system 206 and translate the commands for xHCI 212 or otherwise issue communications based on the received commands to xHCI 212 in a format compatible with xHCI 212. In an embodiment, operating system 206 may load the xHCI driver 208 when a device 204 is attached to the host device 202. In various embodiments, the xHCI driver 208 may perform one or more of initialize registers and memory-based data structures for the xHCI 212, map transfer requests from upper layer drivers to request blocks, submit requests to and receive requests from xHCI 212, handle transfer completion events, propagate events up a driver stack, and control xHCI device slots and endpoint contexts.

The xHCI 212 may interface with one or more processors of host device 202. The xHCI 212 may control the transmission of data between the one or more processors and the USB PHY 214. In doing so, the xHCI 212 may buffer data and enable data flow between the USB PHY 214 and the interconnect 210. The xHCI 212 may be compatible with any suitable protocols, such as USB 1.x, 2.0, 3.x, or future USB standards. In some embodiments, the xHCI 212 sends interrupts to the one or more processors indicating that there is a USB transaction that needs handling. The xHCI 212 may also store a critical state related to bus management (e.g., bandwidth allocation or address assignment).

Interconnect 210 may comprise any suitable circuitry for coupling one or more processors and/or other circuitry of host device 202 to xHCI 212. For example, interconnect 210 may comprise one or more of an on-chip or off-chip interconnect fabric, data bus, or other suitable circuitry.

Host device 202 includes a USB PHY 214 to interface with communications from xHCI 212 and a corresponding USB PHY 216 of USB device 204. USB PHY 214 may provide low level USB protocol and signaling through, e.g., electrical connection, data error detection and correction, scrambling, data serialization and de-serialization, encoding and decoding (e.g., non-return-to-zero-inverted (NRZI) for USB2 or 8b/10b for USB3), clock domain shifting (e.g., from the USB rate to the clock rate of the host device 202), and other functions related to communication with USB data buses. USB PHY 214 may include any suitable components, such as buffers, serializers, deserializers, receivers, drivers, multiplexers, demultiplexers, or other circuitry.

USB device 204 includes USB PHY 216 which may include any one or more of the characteristics described with respect to USB PHY 214. USB PHY 216 may interface with a port of the USB device 204 and with xDCI 218. xDCI 218 may include any one or more of the characteristics described with respect to xHCI 212. xDCI 218 may perform as an interface between the USB PHY 216 and one or more processors or other circuitry of USB device 204.

The USB-C protocol defines four communication paths 220 for high speed data transfer. In one example, a USB-C connector may include 24 pins. Pins A2 (Tx1+) and A3 (Tx1−) may provide a path for a first communication path 220A, pins B2 (Tx2−) and B3 (Tx2+) may provide a path for a second communication path 220B, pins A10 (Rx2−) and A11 (Rx2+) may provide a path for a third communication path 220C, and pins B10 (Rx1−) and B11 (Rx1+) may provide a path for a fourth communication path 220D. In one example, the communication paths may be grouped into lanes that each comprise a transmit path and a receive path.

From the host device's perspective, in typical symmetric operation, communication paths 220A and 220B are configured as Tx paths and communication paths 220C and 220D are configured as Rx paths. In various embodiments, at least one of the Rx paths 220C or 220D is dynamically reconfigurable as a Tx path and at least one of the Tx paths 220A or 220B is dynamically reconfigurable as an Rx path.

In various embodiments, a lane comprising a Tx path and an Rx path may be established as a Configuration Lane (and may be designated as Lane 0). For example, Lane 0 may be established at each port by the CC pin decoding defined by the USB Type-C specification. In various embodiments, all LFPS signaling and LBPM messaging is communicated via the Configuration Lane (and not on the other lane). In a particular embodiment, connect detect and start-up speed negotiation are performed only on the Configuration Lane. In a particular embodiment, the communication paths of the Configuration Lane are not dynamically reconfigured as a Tx or Rx path during dynamic asymmetric communication path allocation (rather one or more of the other lanes is reconfigured).

The USB connectors of host device 202 and USB device 204 may also accommodate additional signaling, such as communication paths for configuration and power. For example, CC signal lines may be used in the discovery (e.g., connection detection), configuration, and management of connections across a USB Type-C cable. Based on the plug orientation, one of the CC signal lines may be used for carrying CC signals while (if the USB plug includes active components in the plug) the other CC line is coupled to a Vconn signal to provide power to the USB connector. The CC signal lines may provide configuration data for power features, audio features (as one example the CC information may configure the connection for an audio adapter accessory mode compatible with analog headphones), video features, PCI features, docking station features, or other features associated with the connection between the devices. Any other suitable communication paths may be provided for by the connectors.

Figure 3:
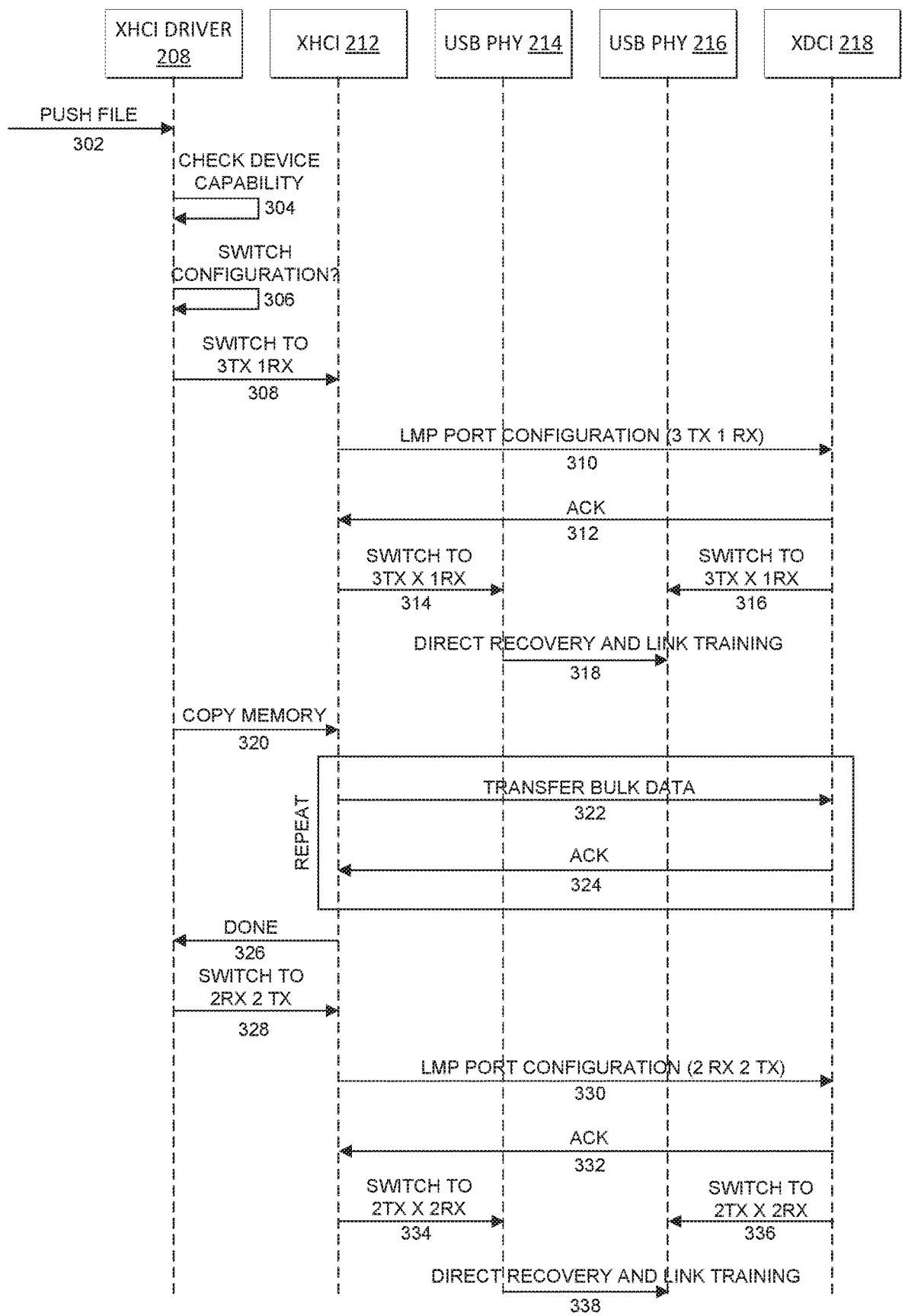
FIG. 3 illustrates a flow for dynamic asymmetric communication path allocation for a transmission dominant data transfer in accordance with certain embodiments.

FIG. 3 illustrates a flow for dynamic asymmetric communication path allocation for a transmission dominant data transfer in accordance with certain embodiments. The flow depicts communications among xHCI driver 208, xHCI 212, USB PHY 214, USB PHY 216, and xDCI 218, although the flow may be adapted for any suitable components of a host device and peripheral device. For example, the functions and characteristics associated with xHCI driver 208 may be applied to any suitable driver for a communication controller, the functions and characteristics associated with xHCI 212 or xDCI 218 may be applied to any suitable communication controller, and the functions and characteristics associated with USB PHY 214 or USB PHY 216 may be applied to any suitable physical layer circuitry.

The flow assumes that the communication paths 220 are configured in a 2 Tx 2 Rx (i.e., two Tx paths, two Rx paths) configuration (or a different configuration than the desired configuration, such as 3 Rx 1 Tx) prior to the start of the flow. Any suitable trigger may initiate a reconfiguration of one or more communication paths 220. For example, a transfer of a file to or from a storage device, transfer of other data (e.g., video), an initialization of a data acquisition procedure (e.g., for data acquisition by a data acquisition device, e.g., an oscilloscope), or other suitable event associated with an asymmetric data flow.

At 302, a request to push a file to USB device 204 is detected at the xHCI driver 208. As an example, the request may be generated by a user of host device 202 or may be otherwise generated via an application or an operating system executed by the host device. The request may include any suitable information, such as one or more of an identification of the file that is to be sent to the USB device 204, a size of the file, an acceptable latency associated with the transfer, a location on USB device 204 to which the file should be stored, or other suitable information (or any of this information may be obtained in response to the request).

At 304, the xHCI driver 208 may check the capability of the USB device 204 to perform dynamic asymmetric communication path allocation. This step may be performed in any suitable manner. In some embodiments, xHCI driver 208 maintains a configuration space comprising a set of registers or other memory regarding the capabilities of the USB device 204 that are set, e.g., prior to or during a device enumeration procedure when the USB device 204 is connected to the host device 202 (as just one example, this indication may be received as described in connection with FIG. 8 below). The xHCI driver 208 may check one or more of these registers at 304 to determine whether USB device 204 is capable of performing dynamic asymmetric communication path allocation. If the USB device 204 is not capable of performing dynamic asymmetric communication path allocation, then the direction of the communication paths 220 may remain unchanged. If the USB device 204 is capable of performing dynamic asymmetric communication path allocation, then the flow moves to 306.

At 306, a determination is made as to whether dynamic asymmetric communication path allocation is to be performed. At 306, the xHCI driver 208 may utilize information associated with the request to determine whether it would be advantageous to change the direction of one or more communication paths to accommodate the request received at 302. Because there is a delay associated with changing the direction of one or more communication paths 220, if the file is relatively small and/or the latency requirement is stringent, the xHCI driver 208 may determine not to change the direction of one or more communication paths 220. In one embodiment, the xHCI driver may determine whether the amount of time expected to be saved by transferring the file via the additional communication path(s) is more than the amount of time expected for reconfiguring the direction of the communication path(s). In a particular embodiment, the determination of whether to switch the direction of the communication path(s) may be performed by utilizing a lookup table (e.g., using the file size and/or a latency requirement to index into the lookup table) or a simple comparison operation (e.g., a determination of whether the file size is larger than a particular threshold).

At 308, xHCI driver 208 sends a request to switch to a 3Tx 1Rx configuration to the xHCI 212. Throughout the flow of FIG. 3 and FIG. 4, when a communication path configuration is specified, it is specified from the perspective of the host device 202. Thus a path labeled as a Tx path is a path that the host device 202 transmits on and a path that the USB device receives on and a path labeled as an Rx path is a path that that the host device 202 receives on and USB device transmits on. At 310, the xHCI then sends a Port Configuration Link Management Packet (LMP) to the xDCI 218 of the USB device 204 (this packet passes through the USB PHY 214 of the host device 202 and the USB PHY 216 of the USB device 204). The Port Configuration LMP includes a request to switch the communication path allocation into a 1Rx 3Tx configuration. Thus, the host device 202 and the USB device 204 each configure three of the communication paths to Tx and one to Rx. In a particular embodiment, the xHCI 212 may direct a link layer of the host device 202 to initiate the Port Configuration LMP message. An example Port Configuration LMP is described in more detail in connection with FIG. 5. In some embodiments, sometime before a Port Configuration LMP is sent, a Port Capability LMP may be exchanged between host device 202 and USB device 204 to set the upstream port and the downstream port.

In other embodiments, the request to switch the communication path configuration may be sent via other messages. As one example, the request may be embodied within an ordered set used for training the communication paths, rather than within an LMP. Such an embodiment is described in more detail in connection with FIG. 7.

At 312, the xDCI 218 sends an acknowledgement in response to the request for reconfiguration. In a particular embodiment, the ACK may comprise a Port Configuration Response LMP or other suitable message indicating that the requested configuration is acceptable. An example Port Configuration Response LMP Port is described in more detail in connection with FIG. 6.

At 314, the xHCI 212 directs the USB PHY 214 of the host device 202 to configure itself in a 3Tx×1Rx path configuration. At 316, the xDCI 218 directs the USB PHY 216 of the USB device 204 to configure a 3Tx×1Rx path configuration. If the communication paths are configured in a 2Rx×2Tx path configuration, USB PHY 214 and USB PHY 216 may each reconfigure a communication path 220 from an Rx path to a Tx path. A host device 202 (e.g., via a USB PHY 214 or other circuitry) and a USB device 204 (e.g., via a USB PHY 216 or other circuitry) may reconfigure a communication path in any suitable manner. In various embodiments, reconfiguration of a communication path may comprise one or more of enabling circuitry (e.g., one or more drivers, buffers, equalization circuits, or other suitable circuitry), disabling circuitry, coupling circuitry together (e.g., via multiplexers, switches, or other circuitry), decoupling circuitry from each other, or other suitable reconfiguration techniques. In a particular embodiment, when a communication path changes direction, the equalization settings from a communication path that is near to the communication path being switched may be utilized for the communication path being switched (such that an equalization settings determination process for the communication path being switched may be omitted). For example, if a Tx path of a lane comprising a Tx path and an Rx path is switched to an Rx path, the equalization setting from the Rx path of the lane may be reused for the receiver.

At 318, USB PHY 214 of the host device 202 sends a direct recovery and link training request to the USB PHY 216 of the USB device 204. This request may direct the USB device 204 to enter a Recovery state and retrain the link (where the link comprises the communication paths 220). In a particular embodiment, the USB PHY 216 may utilize ordered sets for retraining a link. For example, the USB 3.2 specification defines ordered training sets TS1 and TS2. Training packets including these sets may be exchanged over the communication paths of the link to calibrate receiver circuitry. These training sets are discussed in more detail below in connection with FIG. 7.

At 320, data of the file to be pushed may be made available to the xHCI 212 (e.g., it may be copied into one or more buffers accessible to the xHCI 212). At 322, a bulk data transfer (e.g., via a packet) comprising a portion of the file is sent from xHCI 212 to xDCI 218 via respective USB PHYs. The packet may be split up and sent across all three Tx paths simultaneously (or separate packets may be sent on each Tx path simultaneously). An example of a packet striped across three Tx paths will be described below in connection with FIG. At 324, the xDCI 218 sends xHCI 212 an acknowledgement that the portion of the file (e.g., packet) has been received (e.g., via an ACK transaction packet). The acknowledgment may be sent on the Rx path. In various embodiments, acknowledgements for data sent via the three Tx paths may be sent on a single Rx path. In some embodiments, due to the fact that an Enhanced SuperSpeed bus has independent transmit and receive paths, the transmitter (in this case the host device 202) does not have to wait for the explicit acknowledgment for each data packet transferred before sending the next packet. Any number of transfers and acknowledgements may be sent until the entire file has been transferred from the host device 202 to the USB device 204.

Once the file transfer is complete, the xHCI 212 may notify the xHCI driver 208 at 326. In various embodiments, once the data transfer is complete, the system may switch back to a 2Tx 2Rx path configuration automatically. In other embodiments, the system may remain in a 3Tx 1Rx path configuration until a trigger is detected (e.g., the trigger may indicate that a 2Tx 2Rx or a 1Tx 3 Rx path configuration is preferable).

The flow depicts the system transitioning back to a 2Tx 2Rx path configuration. The operations are generally similar to the operations involved in transitioning to the 3Tx 1 Rx configuration. For example, operations 328 through 338 may be analogous to operations 308 through 318.

Some of the operations illustrated in FIG. 3 may be repeated, combined, modified or deleted where appropriate, and additional operations may also be added to the flowchart. Additionally, operations may be performed in any suitable order without departing from the scope of particular embodiments. For example, the order of operations 306 and 304 may be reversed. As another example, either of operations 304 and 306 may be omitted. The order of operations 312, 314, and 316 may also be changed. Other variations are contemplated by this disclosure.

Figure 4:
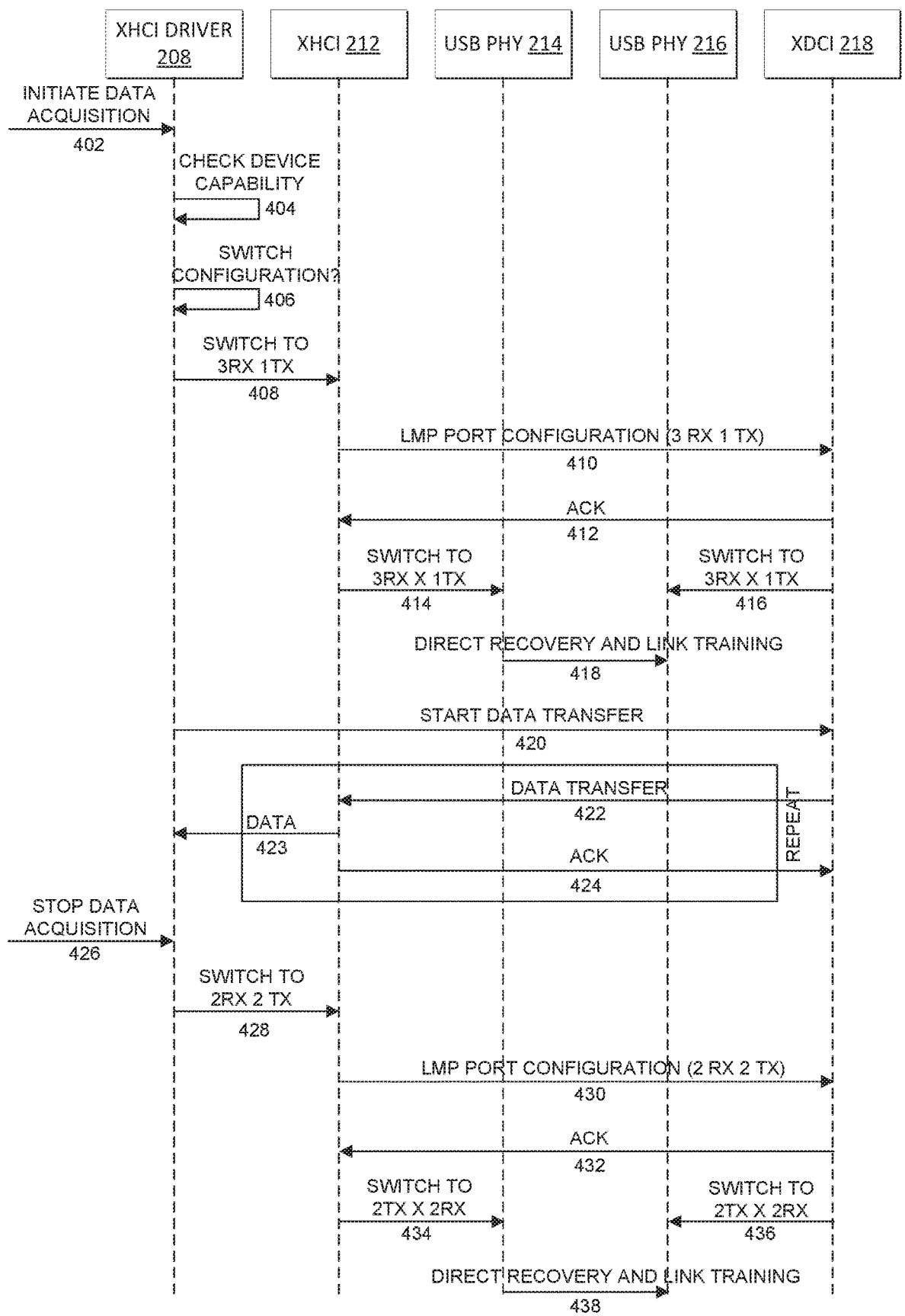
FIG. 4 illustrates a flow for dynamic asymmetric communication path allocation for a reception dominant data transfer in accordance with certain embodiments.

FIG. 4 illustrates a flow for dynamic asymmetric communication path allocation for a reception dominant data transfer in accordance with certain embodiments. The flow depicts communications among xHCI driver 208, xHCI 212, USB PHY 214, USB PHY 216, and xDCI 218, although the flow may be adapted for any suitable components of a host device and peripheral device. For example, the functions and characteristics associated with xHCI driver 208 may be applied to any suitable driver for a controller, the functions and characteristics associated with xHCI or xDCI may be applied to any suitable controller, and the functions and characteristics associated with USB PHY 214 or USB PHY 216 may be applied to any suitable physical layer circuitry. The flow assumes that the communication paths are configured in a 2 Tx 2 Rx configuration (or a different configuration, such as 3 Tx 1 Rx configuration) prior to the start of the flow.

At 402, xHCI driver 208 receives an indication that data acquisition has been initiated. At 404, the xHCI driver 208 may check the capability of the USB device 204 to perform dynamic asymmetric communication path allocation. If the USB device 204 is not capable of performing dynamic asymmetric communication path allocation, then the direction of the communication paths 220 may remain unchanged. If the USB device 204 is capable of performing dynamic asymmetric communication path allocation, then the flow moves to 406. At 406, the xHCI driver 208 may determine to dynamically allocate the communication paths 220 in an asymmetric manner (e.g., in a 3 Rx, 1 Tx configuration) based on any suitable information associated with the request to initiate data acquisition.

At 408, xHCI driver 208 sends a request to switch to a 3Rx 1Tx configuration to the xHCI 212. At 410, the xHCI then sends a Port Configuration LMP to the xDCI 218 of the USB device 204 (this message passes through the USB PHY 214 of the host device 202 and the USB PHY 216 of the USB device 204). The Port Configuration LMP includes a request to switch the communication path configuration into a 3Rx 1Tx configuration. Thus, the host device 202 and the USB device 204 configure three of the communication paths as Rx and one as Tx. In other embodiments, the request to switch the communication path configuration may be sent in any other suitable manner (e.g., as an embedded indication within a training set).

At 412, the xDCI 218 sends an acknowledgement in response to the request for reconfiguration. In a particular embodiment, the ACK may comprise a Port Configuration Response LMP or other suitable message indicating that the requested configuration is acceptable.

At 414, the xHCI 212 directs the USB PHY 214 of the host device 202 to configure itself in a 1Tx×3Rx path configuration. At 416, the xDCI 218 directs the USB PHY 216 of the USB device 204 to configure itself in a 1Tx×3Rx path configuration. If the communication paths were previously configured in a 2Rx×2Tx path configuration, USB PHY 214 and USB PHY 216 may reconfigure a particular communication path 220 from a Tx path to a Rx path. If the communication paths were previously configured in a 3Tx× 1Rx path configuration, then two communication paths may be switched from Tx paths to Rx paths.

At 418, USB PHY 214 of the host device 202 sends a direct recovery and link training request to the USB PHY 216 of the USB device 204. This request may direct the USB PHY 216 to enter a recovery state and retrain the link.

At 420, xHCI driver 208 sends a request to the xDCI 218 to start data transfer. At 422, xDCI 218 transfers data (e.g., in a data packet) acquired by the USB device 204 to the xHCI 212. At 423, the underlying data of the data transfer is provided by the xHCI 212 to the xHCI driver 208. Although not shown, the xHCI driver 208 may make this data available to the operating system or an application executed by the host device 202. xHCI 212 responds to the data transfer with an acknowledgement message at 424. Operations 422, 423, and 424 may be repeated any number of times.

In a particular embodiment, distinct portions of a packet of the data transfer at 422 may be sent across all three Rx paths simultaneously (or separate packets may be sent on each Rx path simultaneously). The acknowledgment at 424 may be sent on the Tx path. In various embodiments, acknowledgements for data sent via the three Rx paths may be sent on a single Tx path. In some embodiments, due to the fact that the Enhanced SuperSpeed bus has independent transmit and receive paths, the transmitter (in this case the USB device 204) does not have to wait for the explicit acknowledgment for each data packet transferred before sending the next packet.

At 426, a command to stop data acquisition is received at the xHCI driver 208. In the embodiment depicted, the xHCI driver 208 then initiates a procedure to return the communication path configuration to 2Tx 2Rx. The operations are generally similar to the operations discussed above. In other embodiments, the xHCI driver may wait until a further command associated with a data transfer is received before initiating a communication path reconfiguration (e.g., if data acquisition was again initiated for the USB device 204, it would be advantageous to remain in the 3Rx 1Tx configuration, but if a more symmetric data transfer operation is initiated, the xHCI driver 208 may switch the configuration to a 2Tx 2 Rx configuration).

Any other suitable triggers may be used to initiate the communication path reconfiguration for a receive dominant transfer. As an additional example, the xHCI driver 208 may receive a notification that a file is to be transferred to the host device 202. In such cases, the xHCI driver 208 may determine whether it would be advantageous to switch to a 3Rx 1Tx path configuration (e.g., in a manner similar to that described above in connection with 306 of FIG. 3). In another embodiment, the USB device 204 may initiate the dynamic communication path reconfiguration (e.g., by sending a request from xDCI 218 to xHCI 212).

Some of the operations illustrated in FIG. 4 may be repeated, combined, modified or deleted where appropriate, and additional steps may also be added to the flowchart. Additionally, operations may be performed in any suitable order without departing from the scope of particular embodiments.

Figure 5:
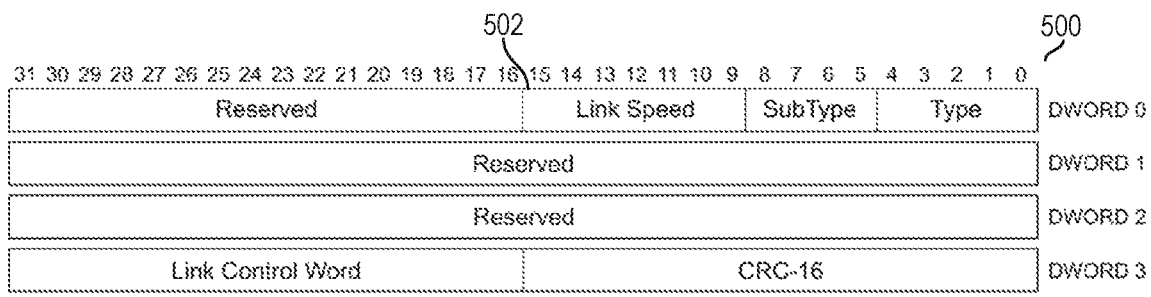
FIG. 5 illustrates a Port Configuration Link Management Packet (LMP) format in accordance with certain embodiments.

FIG. 5 illustrates a Port Configuration LMP format 500 in accordance with certain embodiments. As described above, the Port Configuration LMP may be sent from a host controller (e.g., xHCI 212) to a device controller (e.g., xDCI 218) to request a communication path reconfiguration.

In the embodiment depicted, the Port Configuration LMP comprises four double words DWORD 0 through DWORD 3. In the embodiment depicted, DWORD 0 includes a Link Speed field 502 comprising 7 bits starting at an offset of 9 bits from the start of DWORD 0. In various embodiments, two of the bits of the Link Speed field 502 may be used to define the desired communication path configuration. As an example, a value of 00 may represent a 2Tx 2Rx configuration, 01 may represent a 3Rx 1Tx configuration, and 10 may represent a 3Tx 1 Rx configuration (in other embodiments the configurations may be mapped to the values in any suitable manner). Any two bits of the Link Speed field 502 may be used to designate the desired communication path configuration. In one example, bits 1 and 2 of the Link Speed field 502 (bits 10 and 11 of DWORD 0) may be used to designate the desired communication path configuration. In some embodiments, bit 0 of the Link Speed field 502 may be used to describe a link speed for an upstream port.

In other embodiments, any suitable number of bits of the Link Speed field 502 may be used to designate a desired communication path configuration. For example, three bits may be used in a one-hot encoding scheme to designate one of a 2Tx 2Rx, 3Rx 1 Tx, or 3Tx 1Rx path configuration. In other embodiments, any of the reserved bits of the Port Configuration LMP may be used to designate the desired communication path configuration. For example, any of bits 16:31 of DWORD 0, any of bits of DWORD 2 or DWORD 3, or any of bits 16:31 of DWORD 3 may be used to designate the communication path configuration.

Figure 6:
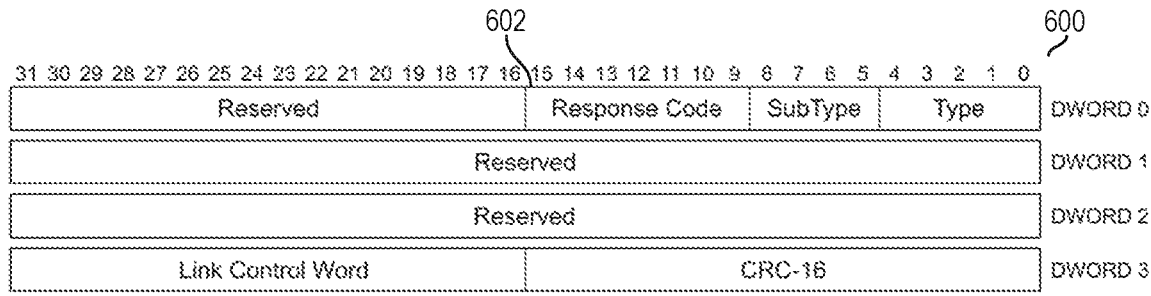
FIG. 6 illustrates a Port Configuration Response LMP format in accordance with certain embodiments.

FIG. 6 illustrates a Port Configuration Response LMP format 600 in accordance with certain embodiments. In a particular embodiment, an acknowledgement to a desired communication path configuration of a Port Configuration LMP may be included in the Port Configuration Response LMP.

In the embodiment depicted, the Port Configuration Response LMP comprises four double words DWORD 0 through DWORD 3. In the embodiment depicted, DWORD 0 includes a Response Code field 602 comprising 7 bits starting at an offset of 9 bits from the start of DWORD 0. In various embodiments, a bit of the Response Code field 602 may be used to acknowledge the desired communication path configuration. For example, the USB device 204 may set this bit if the desired communication path configuration is acceptable or leave the bit unset if the desired communication path configuration is not acceptable. In a particular embodiment, bit 0 of the Response Code field 602 (bit 9 of DWORD 0) may be used to acknowledge the desired communication path configuration. In a particular embodiment, bit 0 of the Response Code field 602 may also be used to acknowledge that a speed designated by the Port Configuration LMP is acceptable. Thus, if bit 0 is not set, the USB device 204 may be signifying that at least one of the speed or the communication path configuration designated by the Port Configuration LMP is not acceptable. In another embodiment, one bit (e.g., bit 0) of the Response Code field 602 may be used to acknowledge the speed and a separate bit of the Response Code field 602 may be used to acknowledge the desired communication path configuration.

Any one or more bits of the Port Configuration Response LMP may be used to acknowledge the desired communication path configuration. For example, any of the bits of the response code field 602, or any of the other bits shown as being reserved in format 600 may be used to acknowledge the desired communication path configuration.

Figure 7:
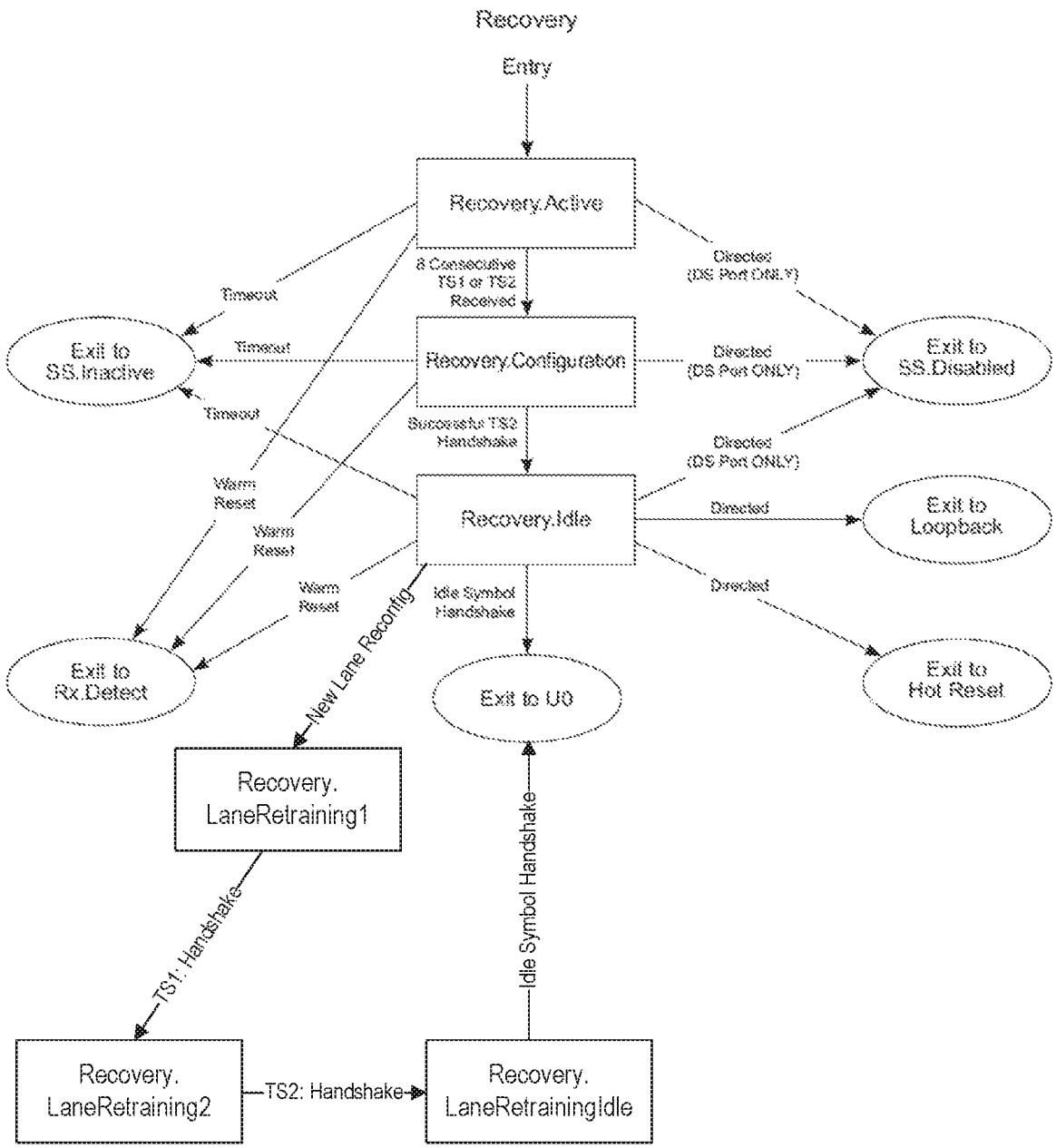
FIG. 7 illustrates substates of a Recovery state in accordance with certain embodiments.

FIG. 7 illustrates substates of a Recovery state in accordance with certain embodiments. In a particular embodiment, the host device 202 and the USB device 204 may each implement a Link Training and Status State Machine (LTSSM) which may, in a particular embodiment, include 12 different link states, including 4 operational link states (U0, U1, U2, and U3) and four link states for link initialization and training (Rx.Detect, Polling, Recovery, and Hot Reset). In various embodiments, device enumeration (which may include a determination of capabilities of the USB device 204) may occur in the U0 state.

The state machine of FIG. 7 depicts various substates of the Recovery state. The Recovery state may be a link state defined for retraining the link (e.g., when two link partners exit from a low power link state, when a link partner has detected that the link is not operating in U0 properly, when a link partner decides to change the mode of link operation, or when a link partner decides to change the communication path configuration). In various embodiments, the state of the LTSSM of a host device 202 may be directed to move from U0 to Recovery in response to a trigger resulting in a communication path reconfiguration as described above (e.g., the Recovery state may be entered by the host device 202 after 314 when the USB PHY 214 is instructed to switch communication path configuration and the Recovery state may be entered by the USB device 204 after 316 after the USB PHY 216 is instructed to switch communication path configuration).

Upon entry into the Recovery state, the state machine moves to the Recovery.Active substate. During this substate one or more ordered training sets (e.g., TS1 or TS2) may be exchanged over the link. In general, TS1 and TS2 enable transmitter and receiver training over the communication paths, such as, e.g., bit lock, block alignment, symbol lock, lane polarity inversion, and Rx equalization trainings. Upon successful reception of an ordered training set, the state machine may move to the Recovery.Configuration substate. After a successful handshake, the state machine moves to Recovery.Idle. From this substate, new substates (e.g., Recovery.LaneRetraining1, Recovery.LaneRetraining2, and Recovery.LaneRetrainingIdle) may be entered. The additional states may enable asymmetric communication path configuration while maintaining backward compatibility.

In a particular embodiment, a desired communication path configuration setting is embedded within the ordered set TS1 or TS2 during training of the link during the Recovery.Active or Recovery.Configuration substates. For example, two or more bits of one or more symbols of TS1 or TS2 may be used to convey an asymmetrical communication path configuration. As one example, bits 6 and 7 of Symbol 5 of the TS2 includes two reserved bits that may be used to convey the communication path configuration. In other embodiments, any suitable bits of TS1, TS2, or other training set may be used to convey the asymmetrical communication path configuration. In a particular embodiment, the two bits dictate which communication path of a pair of communication paths (e.g., a lane that is not a Configuration Lane) will be switched from Tx to Rx or vice versa.

In a particular embodiment, a detection of the communication path configuration setting in one of the ordered sets may cause the USB device 204 to reconfigure itself to match the desired communication path configuration setting. For example, the reconfiguration may be performed in the Recovery.Idle substate and then the state machine may move to the Recovery.LaneRetraining1 sub state.

The link training may then be performed again in the new configuration (e.g., using ordered sets TS1 and TS2). After TS1 is exchanged, the state machine may move to the Recovery.LaneRetraining2 substate, and after TS2 is exchanged, the state machine may move to the Recovery.LaneRetrainingIdle substate. The state machine may then return to state U0, e.g., after an idle packets handshake.

In various embodiments, when the desired communication path configuration setting is included in a Port Configuration LMP (rather than embedded in an ordered training set), the additional substates depicted in the Recovery state machine are not utilized. Rather, the host device 202 and the USB device 204 both enter the Recovery state after the Port Configuration LMP and the Port Configuration Response LMP are sent and training is performed in a standard fashion.

Figures 8, 9:
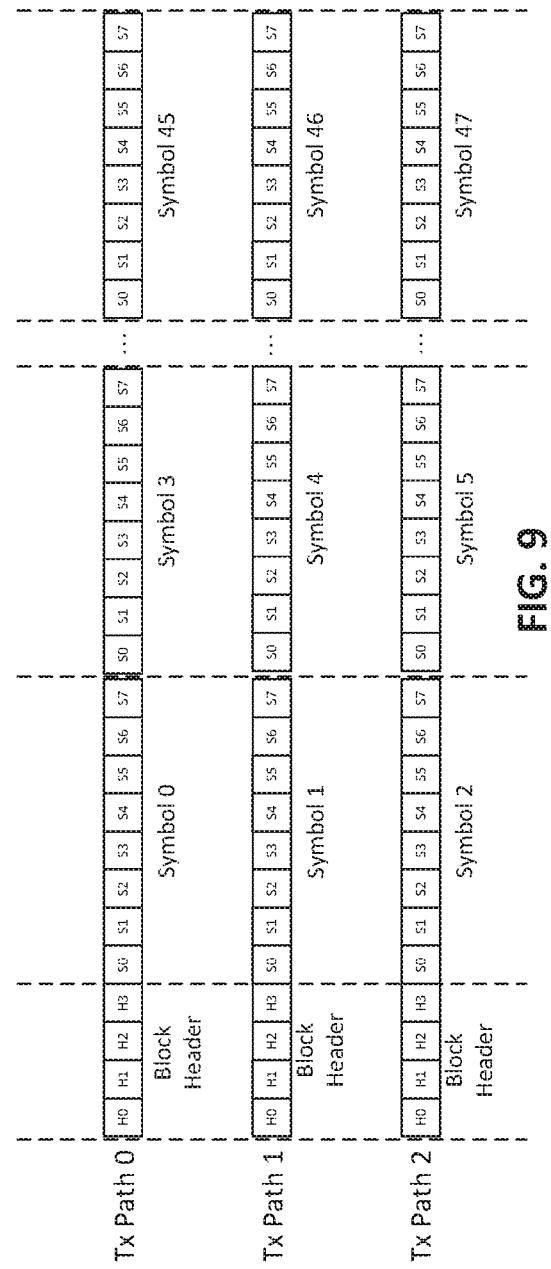
FIG. 8 illustrates a PHY Capability Low Frequency Periodic Signaling (LFPS) Based PWM Message (LBPM) in accordance with certain embodiments.
FIG. 9 illustrates a data striping example for an asymmetric communication path allocation in accordance with certain embodiments.

FIG. 8 illustrates a table 800 of example values and corresponding configurations for a PHY Capability Low Frequency Periodic Signaling (LFPS) Based Pulse Width Modulation (PWM) Message (LBPM) in accordance with certain embodiments. In various embodiments, a PHY Capability LBPM may be used by the USB device 204 to inform the host device 202 about the capability of the USB device 204 to implement dynamic asymmetric communication path allocation. This notification may be used to initialize the communication paths in an asymmetric configuration or it may be used to notify the host device 202 that the USB device 204 is capable of implementing dynamic asymmetric communication path configuration (and the host device 202 may store an indication of the capability for later reference) but the path configuration may be symmetric at initialization.

The PHY Capability LBPM may be exchanged when the link is powered up, e.g., in the Polling.PortMatch substate. In an embodiment, the PHY Capability LBPM may be exchanged by each device (i.e., the host device 202 and the USB device 204) in order to decide the highest common PHY capability between the host device 202 and the USB device 204. In some embodiments, this exchange may take place when a peripheral device is connected to a host device prior to a device enumeration procedure.

Any suitable bits of the PHY Capability LBPM may be used to indicate asymmetric communication path configuration capability. In the embodiment depicted, bit 7 of the PHY Capability LBPM is set when the sending device is capable of asymmetric communication path operation. In a particular embodiment, the PHY Capability LBPM may also specify an initial communication path configuration. For example, in the embodiment depicted, bit 6 specifies the initial communication path configuration. In this example, a set value for bit 6 may specify 3Tx 1Rx path configuration while an unset value for bit 6 may specify a 3Rx 1Tx path configuration. In other embodiments, any suitable values of the PHY Capability LBPM may be used to specify asymmetric communication path configuration capability and/or an initial asymmetric communication path configuration. In a particular embodiment, an asymmetric communication path capability may have a rank that is highest among the PHY capabilities that may be specified in the PHY Capability LBPM (such that if both devices support the asymmetric communication path configuration, the paths will be initialized to the specified configuration). In the embodiment depicted "Gen x" implies Gen 1 or Gen 2 speed.

FIG. 9 illustrates a data striping example for an asymmetric communication path allocation in accordance with certain embodiments. In the embodiment depicted each unit beginning with an H (e.g., H0, H1, H2, . . . ) represents a portion of a header while each unit beginning with an S (e.g., S0, S1, S2, . . . ) represents a portion of a data symbol (where a packet may comprise multiple data symbols). In various embodiments, data symbols sent via three Tx paths are aligned in the same manner as data symbols sent via two Tx paths. In a particular embodiment, data striping may be aligned to a Tx path of Lane 0, which may be a Configuration Lane in some embodiments (that is, symbol 0 is sent via Tx path 0 of Lane 0 and subsequent symbols are sent via the other Tx paths, then symbol 3 is sent via Tx path 0 of Lane 0, and so on). In a particular embodiment, data blocks are striped across the Tx paths but control blocks are not (rather control blocks are duplicated on all Tx paths). In various embodiments, transmission of packets and link commands including framing symbols may be initiated on any of the three Tx paths. For example, transmission of the last byte of a data packet may be made via Tx path 0, and the first byte of a subsequent data packet or link command may be made via Tx path 1.

Numerous specific details are set forth herein, such as examples of specific types of processors and system configurations, specific hardware structures, and specific architectural and micro architectural details in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and bandwidth improvement in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and improved bandwidth. For example, the disclosed embodiments are not limited to particular host devices or peripheral devices, but may apply to any suitable host or peripheral devices such as desktop computer systems, server computer systems, handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatuses, methods, and systems described herein are not limited to physical computing devices, but may also relate to software optimizations for energy conservation and bandwidth utilization.

Figure 10:
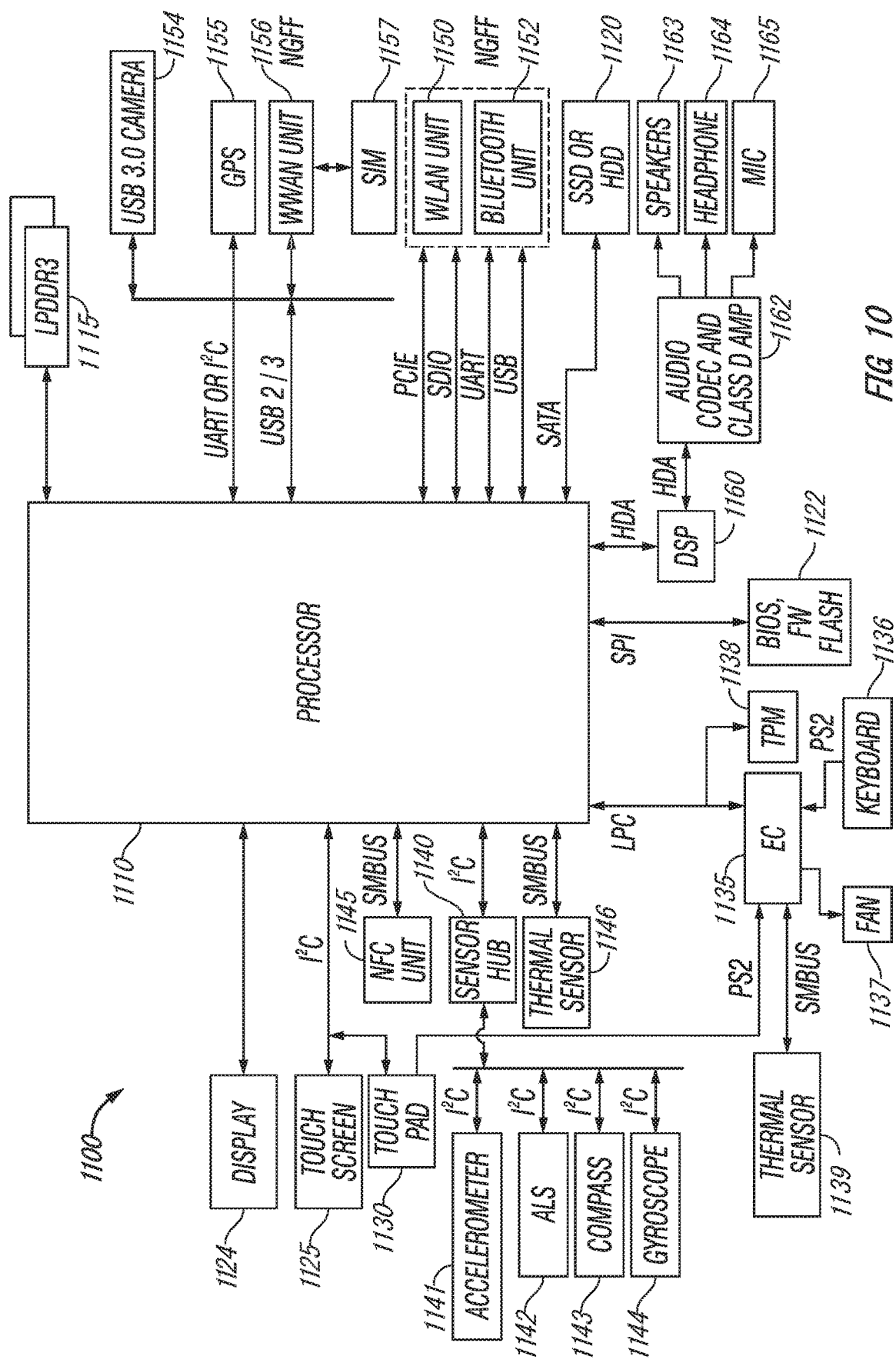
FIG. 10 illustrates a block diagram of components present in a computer system in accordance with certain embodiments.

Referring now to FIG. 10, a block diagram of components present in a computer system that may function as either a host device or a peripheral device (or which may include both a host device and one or more peripheral devices) in accordance with certain embodiments is described. As shown in FIG. 10, system 1100 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 10 is intended to show a high level view of many components of the computer system. However, it is to be understood that some of the components shown may be omitted, additional components may be present, and different arrangement of the components shown may occur in other implementations. As a result, the disclosure described above may be implemented in any portion of one or more of the interconnects illustrated or described below.

As seen in FIG. 10, a processor 1110, in one embodiment, includes a microprocessor, multi-core processor, multi-threaded processor, an ultra low voltage processor, an embedded processor, or other known processing element. In the illustrated implementation, processor 1110 acts as a main processing unit and central hub for communication with many of the various components of the system 1100. As one example, processor 1100 is implemented as a system on a chip (SoC). As a specific illustrative example, processor 1110 includes an Intel® Architecture Core™-based processor such as an i3, i5, i7 or another such processor available from Intel Corporation, Santa Clara, Calif. However, other low power processors such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitecture implementation may vary, but the architectural function of the processor is usually consistent. Certain details regarding the architecture and operation of processor 1110 in one implementation will be discussed further below to provide an illustrative example.

Processor 1110, in one embodiment, communicates with a system memory 1115. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1120 may also couple to processor 1110. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 10, a flash device 1122 may be coupled to processor 1110, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1 TB.

Various input/output (IO) devices may be present within system 1100. Specifically shown in the embodiment of FIG. 10 is a display 1124 which may be a high definition LCD or LED panel configured within a lid portion of the chassis. This display panel may also provide for a touch screen 1125, e.g., adapted externally over the display panel such that via a user's interaction with this touch screen, user inputs can be provided to the system to enable desired operations, e.g., with regard to the display of information, accessing of information and so forth. In one embodiment, display 1124 may be coupled to processor 1110 via a display interconnect that can be implemented as a high performance graphics interconnect. Touch screen 1125 may be coupled to processor 1110 via another interconnect, which in an embodiment can be an I2C interconnect. As further shown in FIG. 10, in addition to touch screen 1125, user input by way of touch can also occur via a touch pad 1130 which may be configured within the chassis and may also be coupled to the same I2C interconnect as touch screen 1125.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080 p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2 ™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1110 in different manners. Certain inertial and environmental sensors may couple to processor 1110 through a sensor hub 1140, e.g., via an I2C interconnect. In the embodiment shown in FIG. 10, these sensors may include an accelerometer 1141, an ambient light sensor (ALS) 1142, a compass 1143 and a gyroscope 1144. Other environmental sensors may include one or more thermal sensors 1146 which in some embodiments couple to processor 1110 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

Also seen in FIG. 10, various peripheral devices may couple to processor 1110. In the embodiment shown, various components can be coupled through an embedded controller 1135. Such components can include a keyboard 1136 (e.g., coupled via a PS2 interface), a fan 1137, and a thermal sensor 1139. In some embodiments, touch pad 1130 may also couple to EC 1135 via a PS2 interface. In addition, a security processor such as a trusted platform module (TPM) 1138 in accordance with the Trusted Computing Group (TCG) TPM Specification Version 1.2, dated Oct. 2, 2003, may also couple to processor 1110 via this LPC interconnect. However, understand the scope of the present disclosure is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus (USB) Revision 3.2 Specification (September 2017), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1100 can communicate with external devices in a variety of manners, including wirelessly. In the embodiment shown in FIG. 10, various wireless modules, each of which can correspond to a radio configured for a particular wireless communication protocol, are present. One manner for wireless communication in a short range such as a near field may be via a near field communication (NFC) unit 1145 which may communicate, in one embodiment with processor 1110 via an SMBus. Note that via this NFC unit 1145, devices in close proximity to each other can communicate. For example, a user can enable system 1100 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 10, additional wireless units can include other short range wireless engines including a WLAN unit 1150 and a Bluetooth unit 1152. Using WLAN unit 1150, Wi-Fi™ communications in accordance with a given Institute of Electrical and Electronics Engineers (IEEE) 802.11 standard can be realized, while via Bluetooth unit 1152, short range communications via a Bluetooth protocol can occur. These units may communicate with processor 1110 via, e.g., a USB link or a universal asynchronous receiver transmitter (UART) link. Or these units may couple to processor 1110 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1156 which in turn may couple to a subscriber identity module (SIM) 1157. In addition, to enable receipt and use of location information, a GPS module 1155 may also be present. Note that in the embodiment shown in FIG. 10, WWAN unit 1156 and an integrated capture device such as a camera module 1154 may communicate via a given USB protocol such as a USB 2.0 or 3.0 link, or a UART or I2C protocol. Again, the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1160, which may couple to processor 1110 via a high definition audio (HDA) link. Similarly, DSP 1160 may communicate with an integrated coder/decoder (CODEC) and amplifier 1162 that in turn may couple to output speakers 1163 which may be implemented within the chassis. Similarly, amplifier and CODEC 1162 can be coupled to receive audio inputs from a microphone 1165 which in an embodiment can be implemented via dual array microphones (such as a digital microphone array) to provide for high quality audio inputs to enable voice-activated control of various operations within the system. Note also that audio outputs can be provided from amplifier/CODEC 1162 to a headphone jack 1164. Although shown with these particular components in the embodiment of FIG. 10, understand the scope of the present disclosure is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1110 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

Power control in the processor can lead to enhanced power savings. For example, power can be dynamically allocated between cores, individual cores can change frequency/voltage, and multiple deep low power states can be provided to enable very low power consumption. In addition, dynamic control of the cores or independent core portions can provide for reduced power consumption by powering off components when they are not being used.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TxT), and Intel® Manageability Engine Technology along with secure user interfaces such as a secure keyboard and display.

Figure 11:
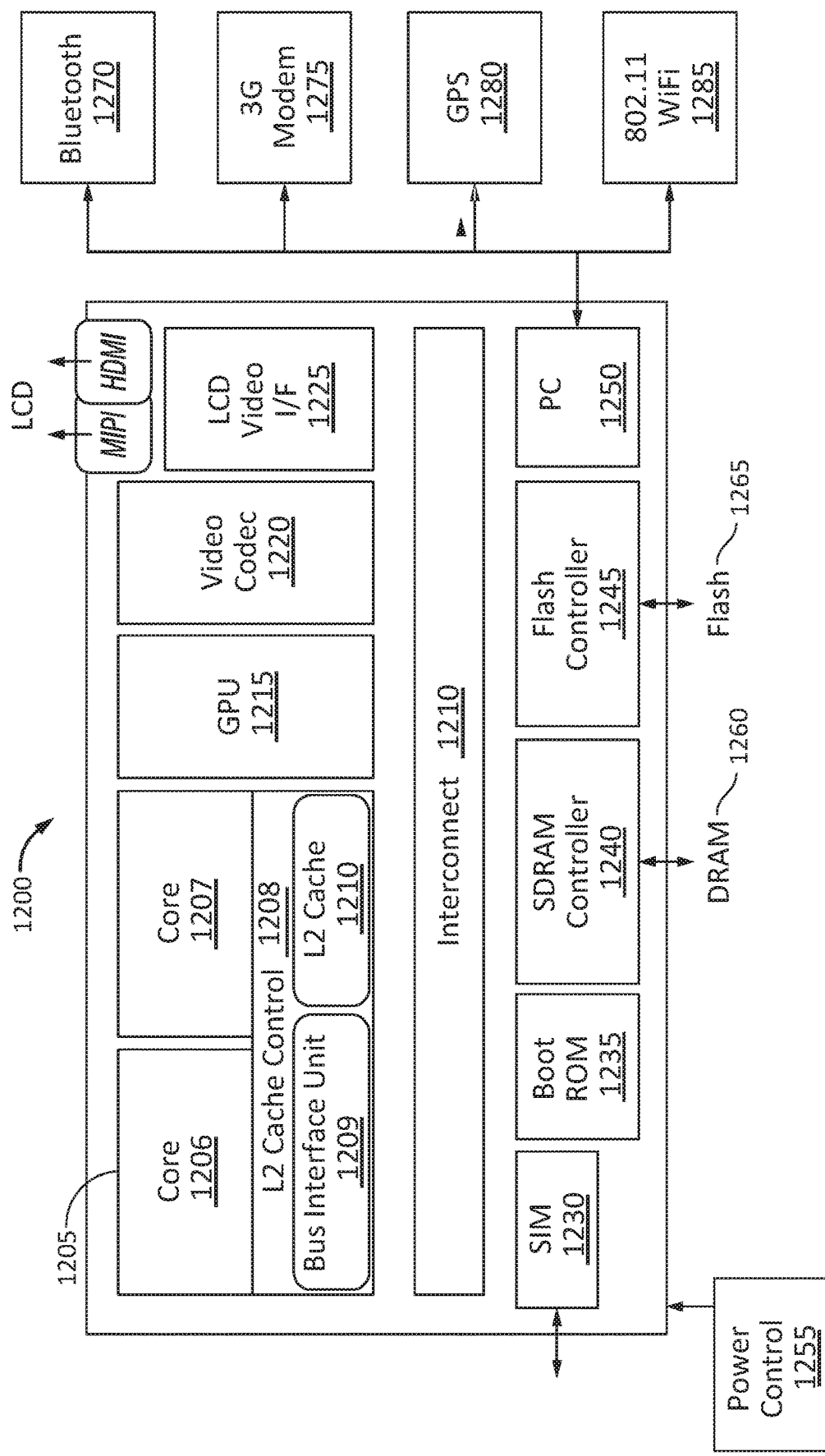
FIG. 11 illustrates another block diagram for an example computing system in accordance with certain embodiments.

Turning next to FIG. 11, another block diagram for an example computing system that may serve as a host device or peripheral device (or may include both a host device and one or more peripheral devices) in accordance with certain embodiments is shown. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 1200 includes 2 cores—1206 and 1207. Similar to the discussion above, cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure.

Interface 1210 provides communication channels to the other components, such as a Subscriber Identity Module (SIM) 1230 to interface with a SIM card, a boot rom 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein.

In addition, the system illustrates peripherals for communication, such as a Bluetooth module 1270, 3G modem 1275, GPS 1280, and WiFi 1285. Note as stated above, a UE includes a radio for communication. As a result, these peripheral communication modules are not all required. However, in a UE some form of a radio for external communication is to be included.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any non-transitory mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; or other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

One or more embodiments may provide an apparatus, a system, or hardware- and/or software-based logic comprising a port to couple to a plurality of communication paths comprising a first, second, third, and fourth communication path, the communication paths each having a direction of either a receive path or a transmit path, the communication paths comprising a first communication path having a direction that may be selectively configured as a receive path or a transmit path; and a controller comprising circuitry, the controller to in response to a communication path reconfiguration command, reconfigure the direction of the first communication path such that the first communication path, second communication path, and third communication path have the same direction and the fourth communication path has a direction opposite to the direction of the first, second, and third communication paths.

In at least one example, the controller is further to receive the communication path reconfiguration command from a software driver. In at least one example, the controller is further to receive the communication path reconfiguration command from a software driver. In at least one example, the software driver is to generate the communication path reconfiguration command in response to an expected asymmetric traffic flow across the communication paths. In at least one example, the software driver is to determine to generate the communication path reconfiguration command based on a latency associated with reconfiguration of the first communication path and a size of a data transfer. In at least one example, the software driver is to during initialization of a link to a device coupled to the plurality of communication paths, store an indication that the device is capable of reconfiguring the direction of the first communication path; and generate the communication path reconfiguration command in response to checking the indication to verify that the device is capable of reconfiguring the direction of the first communication path. In at least one example, the controller is further to, in response to the communication path reconfiguration command, send a request to a controller of a device coupled to the plurality of communication paths, the request to specify reconfiguration of the direction of first communication path. In at least one example, the request is included in a Port Configuration Link Management Packet (LMP). In at least one example, the request is embedded within a link training packet. In at least one example, the controller is further to receive an acknowledgment from the controller of the device in response to the request. In at least one example, the acknowledgement is included in a Port Configuration Response LMP. In at least one example, the direction of the second communication path is selectively configurable as a receive path or a transmit path; the direction of the third communication path is fixed as a transmit path; and the direction of the fourth communication path is fixed as a receive path.

In at least one example, in response to the communication path reconfiguration command, the controller is to cause reconfiguration the direction of the first communication path from a receive path to a transmit path such that three of the communication paths are configured as transmit paths and one of the communication paths is configured as a receive path. In at least one example, the controller is further to transmit a data packet in a striped manner across the three transmit paths and a header associated with the data packet in a replicated manner across the three transmit paths. In at least one example, the apparatus, system, or hardware-and/or software-based logic further comprises a second port to couple to a plurality of second communication paths, wherein, in response to an expected asymmetric traffic flow, the controller is to reconfigure the direction of the first communication path from a receive path to a transmit path; and reconfigure a direction of a communication path of the second communication paths from a transmit path to a receive path.

One or more embodiments may provide an apparatus, a system, or hardware- and/or software-based logic comprising a processor to comprise circuitry, the processor to execute a software driver, the software driver to receive, from an operating system, information associated with a data transfer; and in response to the information associated with the data transfer, send a communication path reconfiguration command to a communication controller, wherein the communication path reconfiguration command is to cause the communication controller to reconfigure a direction of a first communication path of a plurality of communication paths, the communication paths comprising the first communication path and second, third, and fourth communication paths, the communication paths each having a direction of either a receive path or a transmit path, wherein the direction of the first communication path is selectively configurable between a transmit path or a receive path and reconfiguration of the first communication path results in a configuration in which the first, second, and third communication paths have the same direction and the fourth communication path has a direction opposite to the direction of the first, second, and third communication paths.

In at least one example, the apparatus, system, or hardware- and/or software-based logic further comprises the communication controller and a port to couple to the first communication path. In at least one example, the software driver is to generate the communication path reconfiguration command in response to an expected asymmetric traffic flow across a plurality of communication paths.

One or more embodiments may provide a machine readable storage comprising instructions, a machine readable medium comprising instruction, a method, or a non-transitory machine readable medium (including information to represent structures, when manufactured, to be configured) to receive information associated with a data transfer; and in response to the information associated with the data transfer, send a communication path reconfiguration command to a communication controller, wherein the communication path reconfiguration command is to cause the communication controller to reconfigure a direction of a first communication path of a plurality of communication paths, the communication paths comprising the first communication path and second, third, and fourth communication paths, the communication paths each having a direction of either a receive path or a transmit path, wherein the direction of the first communication path is selectively configurable between a transmit path or a receive path and reconfiguration of the first communication path results in a configuration in which the first, second, and third communication paths have the same direction and the fourth communication path has a direction opposite to the direction of the first, second, and third communication paths.

In at least one example, a machine readable storage comprising instructions, a machine readable medium comprising instruction, a method, or a non-transitory machine readable medium (including information to represent structures, when manufactured, to be configured) may further determine to generate the communication path reconfiguration command based on a latency associated with reconfiguration of the first communication path and a size of a data transfer. In at least one example, a machine readable storage comprising instructions, a machine readable medium comprising instruction, a method, or a non-transitory machine readable medium (including information to represent structures, when manufactured, to be configured) may further generate the communication path reconfiguration command in response to an expected asymmetric traffic flow across a plurality of communication paths.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a port to couple to a plurality of communication paths comprising a first, second, third, and fourth communication path, the plurality of communication paths each having a direction of either a receive path or a transmit path, wherein the first communication path has a direction that may be selectively configured as a receive path or a transmit path; and
   a controller comprising circuitry, the controller to:
      in response to a communication path reconfiguration command generated based on a latency associated with reconfiguration of a direction of the first communication path and a size of a data transfer, reconfigure the direction of the first communication path such that the first communication path, second communication path, and third communication path have the same direction and the fourth communication path has a direction opposite to the direction of the first, second, and third communication paths.

2. The apparatus of claim 1, wherein the controller is further to receive the communication path reconfiguration command from a software driver.

3. The apparatus of claim 2, the software driver to generate the communication path reconfiguration command in response to an expected asymmetric traffic flow across the plurality of communication paths.

4. The apparatus of claim 2, further comprising a processor core to execute the software driver, wherein the software driver is to determine to generate the communication path reconfiguration command based on the latency associated with reconfiguration of the first communication path and the size of a data transfer.

5. The apparatus of claim 2, wherein the software driver is to:
   during initialization of a link to a device coupled to the plurality of communication paths, store an indication that the device is capable of reconfiguring the direction of the first communication path; and
   generate the communication path reconfiguration command in response to checking the indication to verify that the device is capable of reconfiguring the direction of the first communication path.

6. The apparatus of claim 1, the controller further to:
   in response to the communication path reconfiguration command, send a request to a controller of a device coupled to the plurality of communication paths, the request to specify reconfiguration of the direction of the first communication path.

7. The apparatus of claim 6, wherein the request is included in a Port Configuration Link Management Packet (LMP).

8. The apparatus of claim 6, wherein the request is embedded within a link training packet.

9. The apparatus of claim 6, the controller further to:
   receive an acknowledgment from the controller of the device in response to the request.

10. The apparatus of claim 9, wherein the acknowledgement is included in a Port Configuration Response Link Management Packet (LMP).

11. The apparatus of claim 1, wherein:
    the direction of the second communication path is selectively configurable as a receive path or a transmit path;
    the direction of the third communication path is fixed as a transmit path; and
    the direction of the fourth communication path is fixed as a receive path.

12. The apparatus of claim 1, wherein, in response to the communication path reconfiguration command, the controller is to cause reconfiguration of the direction of the first communication path from a receive path to a transmit path such that three of the plurality of communication paths are configured as transmit paths and one of the plurality of communication paths is configured as a receive path.

13. The apparatus of claim 12, the controller further to transmit a data packet in a striped manner across the three transmit paths and a header associated with the data packet in a replicated manner across the three transmit paths.

14. The apparatus of claim 1, further comprising a second port to couple to a plurality of second communication paths, wherein, in response to an expected asymmetric traffic flow, the controller is to:
    reconfigure the direction of the first communication path from a receive path to a transmit path; and
    reconfigure a direction of a communication path of the plurality of second communication paths from a transmit path to a receive path.

15. A system comprising:
    a processor comprising circuitry, the processor to execute a software driver, the software driver to:
       receive, from an operating system, information associated with a data transfer, wherein the information associated with the data transfer includes a latency associated with reconfiguration of a direction of a first communication path of a plurality of communication paths and a size of a data transfer; and in response to the information associated with the data transfer, send a communication path reconfiguration command to a communication controller, wherein the communication path reconfiguration command is to cause the communication controller to reconfigure the direction of the first communication path of the plurality of communication paths, the plurality of communication paths comprising the first communication path and second, third, and fourth communication paths, the communication paths each having a direction of either a receive path or a transmit path, wherein the direction of the first communication path is selectively configurable between a transmit path or a receive path and reconfiguration of the first communication path results in a configuration in which the first, second, and third communication paths have the same direction and the fourth communication path has a direction opposite to the direction of the first, second, and third communication paths.

16. The system of claim 15, further comprising the communication controller and a port to couple to the first communication path.

17. The system of claim 15, wherein the software driver is to generate the communication path reconfiguration command in response to an expected asymmetric traffic flow across a plurality of communication paths.

18. A non-transitory machine readable medium including instructions that, when executed by a machine, are to:
receive information associated with a data transfer, wherein the information associated with the data transfer includes a latency associated with reconfiguration of a direction of a first communication path of a plurality of communication paths and a size of a data transfer; and
in response to the information associated with the data transfer, send a communication path reconfiguration command to a communication controller, wherein the communication path reconfiguration command is to cause the communication controller to reconfigure the direction of the first communication path of the plurality of communication paths, the plurality of communication paths comprising the first communication path and second, third, and fourth communication paths, the plurality of communication paths each having a direction of either a receive path or a transmit path, wherein the direction of the first communication path is selectively configurable between a transmit path or a receive path and reconfiguration of the first communication path results in a configuration in which the first, second, and third communication paths have the same direction and the fourth communication path has a direction opposite to the direction of the first, second, and third communication paths.

19. The medium of claim 18, wherein the instructions when executed are further to determine to generate the communication path reconfiguration command based on the latency associated with reconfiguration of the first communication path and the size of a data transfer.

20. The medium of claim 18, wherein the instructions when executed are further to generate the communication path reconfiguration command in response to an expected asymmetric traffic flow across a plurality of communication path.

* * * * *